Jan. 20, 1942.   A. M. WOLF   2,270,366
BRAKE OPERATING MECHANISM
Original Filed April 15, 1933
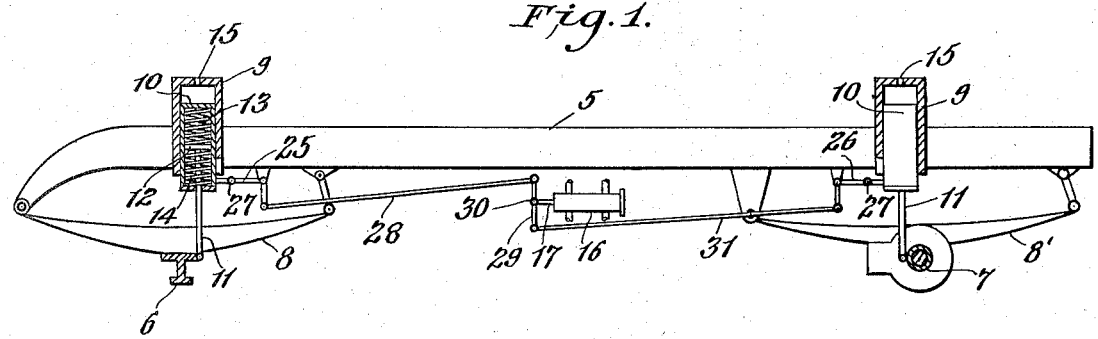
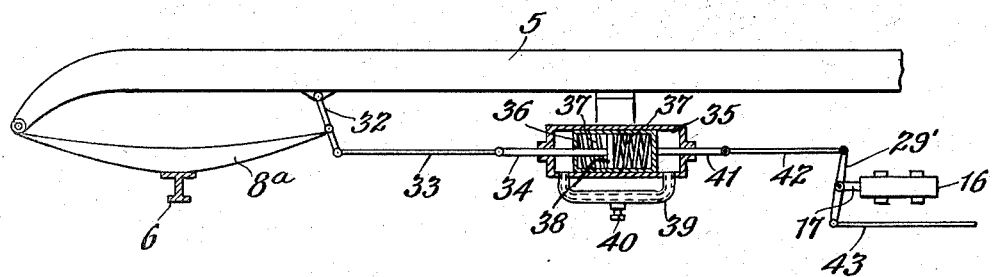
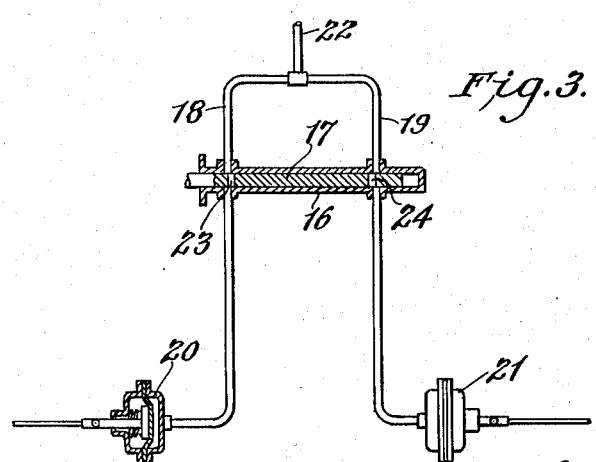
INVENTOR.
Austin M. Wolf,
BY M. C. Lyddane
ATTORNEY.

Patented Jan. 20, 1942

2,270,366

UNITED STATES PATENT OFFICE 2,270,366

BRAKE OPERATING MECHANISM

Austin M. Wolf, Plainfield, N. J.

Original application April 15, 1933, Serial No. 666,332. Divided and this application November 27, 1939, Serial No. 306,299

8 Claims. (Cl. 188—195)

This invention relates to brake operating mechanism, the subject matter of the present application constituting a division of my pending application for patent Ser. No. 666,332 filed April 15, 1933, now Patent No. 2,181,161, November 28, 1939.

The above application discloses means for automatically distributing braking pressures between the front and rear wheels of a motor vehicle and for regulating or varying the ratio of the braking effort in response to variable impulses derived from a number of different factors whereby maximum efficiency in brake operation is obtained and the rapid and safe deceleration of the vehicle effected.

It is a general object and purpose of the present invention to automatically effect such variable proportional distribution of braking effort between the front and rear vehicle wheels in response to variation in the static loading of the vehicle.

It is a further object of the invention to provide, in combination with a movable brake pressure regulating or proportioning member, a dashpot connected with a yieldingly suspended vehicle body and means operatively connecting a movable element of the dash-pot with said brake pressure proportioning member to actuate the latter in response to relative movement between the vehicle body and wheel axles incident to distribution of the load.

It is also an additional object of the invention to provide a device for the above purpose which is efficient and reliable in operation, simple and inexpensive in its construction and capable of application to standard types of commercial or pleasure vehicles without necessitating any material structural modifications thereof.

With the above and other objects in view, the invention consists in the improved operating means for motor vehicle brakes and in the form, construction and relative arrangement of its several parts as will hereinafter be more fully described, illustrated in the accompanying drawing and subsequently incorporated in the subjoined claims.

In the drawing wherein I have illustrated several simple and practical embodiments of the invention and in which similar reference characters designate corresponding parts throughout the several views:

Fig. 1 is a side elevation partly in section showing one embodiment of my present improvements as applied to a conventional type of vehicle body frame and suspension system.

Fig. 2 is a similar view illustrating a modification thereof, and

Fig. 3 is a detail sectional view showing one form of the brake pressure regulating or proportioning valve.

It is generally recognized in the art that a constant equal distribution of braking effort between the front and rear wheels of a motor vehicle does not give satisfactory performance for all operating conditions. It is, therefore, necessary that the distribution of braking effort between the front and rear wheel brakes be varied to cope with changing conditions, and it is, of course, desirable that such variation should be automatic so as to relieve the driver of additional physical effort in the proper control of the vehicle. One of the factors which must be considered, if maximum braking efficiency is to be obtained, is that of static load distribution, since it is apparent that, due to the increase of weight on the front vehicle wheels during deceleration, a greater braking effort must be applied to the front wheels. This added braking effort should vary in proportion to changes in load distribution.

To the above end, in the accompanying drawing I have shown a vehicle body supporting frame or chassis 5. This body frame is sustained in normal spaced relation above the front and rear vehicle axles 6 and 7 respectively by means of a yieldable suspension system of a standard type. I have herein shown the conventional front and rear springs 8 and 8' respectively suitably mounted on the vehicle axles and connected at their opposite ends with the side rails of the frame or chassis 5.

In commercial vehicles and buses a wide latitude exists in possible loading conditions, particularly when the vehicle is not fully loaded. It is, therefore, very difficult to predetermine the best definite proportions of braking pressures between the front and rear wheel braking units. Therefore, in Fig. 1 of the drawing I have disclosed a means which is independently responsive to the static loading at each end of the vehicle so that an increase of load weight on either end will increase the ratio of braking pressure at the corresponding end of the vehicle. This means may comprise front and rear dash-pots each of which includes an outer cylinder 9 suitably fixed to the side rail of the vehicle and open at its lower end. Within this cylinder, a second double-ended cylinder 10 has reciprocating movement. A rod 11 is pivotally connected at its lower end with the vehicle axle and extends upwardly therefrom through the lower end wall of the cylinder 10 and is provided at its upper end with the head 12 movable in said cylinder. Springs 13 and 14 respectively are disposed between the opposite ends of said cylinder and the head 12 to yieldingly resist relative movement between said head and cylinder. The upper wall of the outer cylinder 9 is provided with a small vent orifice 15 which provides a dash-pot effect in the reciprocating movement of cylinder 10 relative to the cylinder 9. This dash-pot effect and the springs 13 and 14 permit of slight relative movement between the two cylinders in normal travel of the vehicle over the road.

The brake pressure regulating and proportioning means is more particularly illustrated in Fig. 3 of the drawing, and, as disclosed in my copending application includes a suitable casing 16 for the pressure regulating valve on member 17. Near its opposite ends pressure fluid distributing pipes 18 and 19 respectively are connected with the valve casing, the pipe 18 supplying the pressure fluid to the front brake operating cylinder 20 while the pipe 19 supplies the pressure fluid to the rear brake operating cylinder 21. The distributing pipes 18 and 19 are connected with a common pressure fluid supply pipe 22. The latter pipe is supplied with high pressure air or hydraulic liquid from a reservoir carried by the vehicle, and under the control of a suitable operator's control valve.

The slide valve 17 is provided with the ports 23 and 24 respectively which are so related to the distributing pipes 18 and 19 that in the normal position of said valve pressure fluid will be supplied in equal proportion to the cylinders 20 and 21. In the movement of said valve to the left from its illustrated position, it is apparent that the supply of pressure fluid to the front brake cylinder 20 will be increased while the supply of pressure fluid to the rear brake cylinder 21 will be proportionately decreased.

Suitable operating connections are provided between the front and rear dash-pot cylinders 10 and the pressure regulating or proportioning valve 17. As herein shown, these connections include bell crank levers 25 and 26 having one of their arms pivotally connected respectively with said dash-pot cylinders as indicated at 27. The other arm of bell crank lever 25 is connected by rod 28 with the upper end of the equalizer bar 29 which is pivotally connected at its center as at 30 to the end of the slide valve 17. The lower end of this equalizer bar is similarly connected by a rod 31 to the other arm of the bell crank lever 26.

It will be evident from the above description that upon addition of load to the front end of the vehicle, the deflection of spring 8 will allow the front dash-pot cylinder 9 to approach the axle 6, or considering the vehicle frame 5 as stationary, to permit the upward movement of the axle toward said frame while the cylinder 10 moves upwardly in the cylinder 9. This relative movement between the vehicle frame and axle imparts a clockwise rotation to the bell crank 25, and through the connecting rod 28 actuates equalizer bar 29 to move the slide valve 17 to the left so that the brake pressure fluid will be supplied to the front brake cylinder 20 in increased proportion with respect to the supply of pressure fluid to the rear brake cylinder 21. Greater loading of the rear end of the vehicle, in a similar manner causes a counterclockwise rotation of bell crank 26, and through the connecting rod 31 actuates equalizer bar 29 to move the slide valve 17 to the right, and thus increase the proportion of braking pressure on the rear vehicle wheels while correspondingly reducing the proportion of the braking effort on the front wheels. In this manner, the braking effort is increased at either end of the vehicle in proportion to variation in the distribution of the load between the vehicle ends. Of course, if both ends are equally loaded, the equalizer bar 29 will then remain in the illustrated position and the slide valve 17 will not be shifted.

In Fig. 2 of the drawing I have disclosed an alternative embodiment of the invention, in which the rear end of the front spring 8a is connected with the frame or chassis 5 by the shackle member 32 which extends above and below the end of the spring. As the vehicle load increases the compression of the spring 8a, the longitudinal extension of said spring will cause the lower end of the shackle member 32 to move to the right. This movement is transmitted through connecting rod 33 to the rod 34 of a horizontally arranged dash-pot mounted on the vehicle frame. This dash-pot includes the outer cylinder 35 and an inner cylinder 36 containing springs 37 between the cylinder ends and opposite sides of the head 38 on the end of rod 34. In the dash-pot, either air or a hydraulic medium may be used as the resistant fluid, and the opposite ends of the cylinder 35 are connected by the tube 38 having a central metering point controlled by the adjustable screw 40. Thus vibratory movement between the vehicle axle and the frame will be damped out, in the same manner as heretofore described.

To the opposite end of the cylinder 36 from the rod 34 a rod 41 is connected and is movable in a bearing on the corresponding end of cylinder 35. The outer end of this rod is connected by the link 42 with the upper end of equalizer bar 29' connected with the brake pressure regulating valve member 17.

The front end of the rear vehicle spring is also connected with the frame 5 by a shackle member similar to the member 32, and said shackle member is connected with the lower end of the equalizer bar 29' by the rod 43.

In the arrangement of Fig. 1, upon the compression of the spring 8, rod 28 moves forwardly while in Fig. 2, the rod 33 moves rearwardly under compression of spring 8a. This, however, is readily taken care of by merely transposing the fluid pressure distributing connections 18 and 19 with the valve casing 16. It will, therefore, be evident that in the movement of the vehicle frame at either end in response to load distribution, such movement will be communicated to the equalizer bar 29' and the brake pressure proportioning valve 17 actuated accordingly, in the manner above explained. In this latter embodiment of the invention, however, the single dashpot provides a common control means for the actuating connections between both the front and rear ends of the vehicle body and the brake pressure regulating valve.

From the foregoing description considered in connection with the accompanying drawing, the described embodiments of the present invention and the several advantages thereof in practical operation will be clearly understood. It will be appreciated that in a very simple mechanical construction and arrangement of the several parts, I provide means which is automatically responsive to variable load distribution of the vehicle for pre-positioning the brake pressure regulating valve 17 so that when the operator's control valve is actuated to apply the brakes, the most effective proportional distribution of braking pressures upon the front and rear wheel brakes will be obtained in accordance with variable weight distribution upon the front and rear wheels so as to effect the proper and safe deceleration of vehicle speed, and quickly bring the vehicle to a complete stop.

It will, of course, be understood that the present disclosure is largely suggestive as to the form, construction and relative arrangement of the various cooperating elements and that the essential features of the invention may also be exemplified in various other alternative structural forms. Accordingly, I reserve the privilege of resorting to all such legitimate modifications in the form, construction and combination of the several parts as may fairly be considered to be within the spirit and scope of the appended claims.

I claim:

1. In combination with a vehicle body, supporting axles therefor, and a single means for proportionally regulating the braking effort of front and rear brakes, a relatively movable connection between each end of the vehicle body and the supporting axle therefor, and means responsive to movement of either of said connections including a common operating member to actuate said regulating means and variably proportion the distribution of braking effort between the front and rear brakes.

2. In combination with a vehicle having a common means for proportionally regulating the braking effort of front and rear brakes, means responsive to distribution of the vehicle load for actuating said regulating means to differentially proportion the distribution of braking effort between the front and rear brakes.

3. In combination with a vehicle having a common means for proportionally regulating the braking effort of front and rear brakes, independently operative means on each end of the vehicle responsive to distribution of the vehicle load and connected with said regulating means to actuate the latter and differentially proportion the distribution of braking effort between the front and rear brakes.

4. In combination with a vehicle having a common means for proportionally regulating the braking effort of front and rear brakes, a dash-pot at each end of the vehicle responsive to distribution of the vehicle load, and independently operative connections between said regulating means and the respective dash-pots, operatively controlled by the latter to differentially proportion the distribution of braking effort between the front and rear brakes.

5. In combination with a vehicle having a suspension system and means for regulating the braking effort between front and rear brakes; and means including a member common to the front and rear brakes for actuating said regulating means in response to reaction of the suspension system to increase the braking effort on the front brakes relative to the braking effort on the rear brakes in proportion to the amplitude of vertical displacement between the vehicle body and axles.

6. In combination with means for differentially regulating the braking effort between front and rear brakes of a vehicle including a movable regulating member common to both brakes, an actuating element for said regulating member, and a device at each end of the vehicle responsive to the load borne thereby and operatively connected with said actuating element, said connecting means independently operating said element to actuate the regulating member and differentially proportion the braking effort on the front and rear brakes in accordance with the distribution of the vehicle load.

7. In combination with a vehicle having a single fluid pressure distributing unit for differentially controlling the braking effort of front and rear vehicle brakes, front and rear vehicle body suspension devices, and means controlling the operation of said distributing unit connected with and operatively responsive to the independent reaction of said suspension devices.

8. In combination with a vehicle having a single fluid pressure distributing unit for differentially controlling the braking effort of front and rear vehicle brakes, said unit including a movable valve member, front and rear vehicle body suspension devices, and independently operable actuating connections between said valve member and each of said suspension devices.

AUSTIN M. WOLF.